United States Patent Office 3,203,813
Patented Aug. 31, 1965

3,203,813
THERMAL INSULATING MATERIAL, COMPOSITION AND PROCESS FOR MAKING THE SAME
Vincent H. Gajardo, Fairless Hills, and John S. Dennis, Yardley, Pa., assignors to United Clay Mines Corporation, Trenton, N.J., a corporation of New Jersey
No Drawing. Filed June 18, 1962, Ser. No. 203,020
6 Claims. (Cl. 106—40)

This invention relates to moldable insulating material of the refractory type and to a process devised for its making. More particularly it relates to the nature of the binder employed and to the process of obtaining optimum dispersion of the binder throughout the insulating material.

For many years those skilled in the art have provided many solutions to the problem of low cost insulating material for use in commercial and residential building and with considerable attention given to diminution of fire hazards. Some of the materials proposed have met these objectives but at an excessive cost. While low cost insulating materials have been provided, they have had the disadvantage of a high degree of shrinkage when subjected to high temperatures with consequent failure at the very time they should offer maximum resistance to spread of fire. In other instances, the insulating material, while a good insulator, has had ingredients which when subjected to high temperatures are combustible and thus worked to the disadvantage of the object of fire safeguards in building construction. For example, it has been proposed to manufacture molded thermal insulating material by utilizing organic bonding agents which are particularly subject to degradation at higher temperatures to which heat-insulating material may be frequently subjected.

In accordance with the present invention, there has been provided a moldable insulating material in which the primary component parts are of a refractory character and which lend themselves to molding into any desired shapes, such as in building blocks, ceiling tile, and for covering pipes, conduits and high temperature vessels.

In accordance with the present invention, the insulating material, due to its refractory nature, is able to withstand a broad temperature range, viz., from about room temperature up to about 1700° F., without critical impairment to its physical properties.

It is still another object of the invention to provide an insulating material which will be highly resistant to structural deterioration by moisture, besides being resistant to attack by vermin, insects and fungi.

The above objectives and others to be pointed out hereinafter we accomplish by formulation of a new composition and by methods which we shall now disclose in connection with certain exemplary embodiments.

In accordance with this invention, the components of the insulating product will be composed largely of an expanded cellular aggregate, of a minor amount of clay, together with an inorganic binder that is made water resistant by a mild heat treatment; and for certain special cases by the combined effects of heat and added waterproofing agents, such as silicones, finely divided calcium carbonate or zinc oxide, etc. To the first three components we incorporate a foaming agent inert to, or compatible with, the inorganic binder. The foaming agent's main function is to increase the volume of the binder ingredients, whereby uniform coverage of the light weight aggregate is attained.

In a preferred embodiment of the invention, where good insulation qualities are sought, an expanded perlite may be utilized which will in preference have the following characteristics: (a) a loose bulk density of between 2 and 6 pounds per cubic foot, (b) a particle size pattern where the percent residue retained on a standard Tyler mesh #60 will be from a minimum of 30% to a maximum of 80% by weight.

Furthermore, the preferred expanded perlite will not only have a substantial absence of shatter material but it will be characterized by a high percentage of floats, i.e., glass beads in hollow particulate form having a smooth surface and relatively free from adherent material which interferes with both good insulating and bonding properties of the product to be developed therewith. Expanded perlite characterized as generally non-fragile will be preferred.

It is to be understood that the expanded perlite having the above characteristics is not necessary prerequisite for those products where density, strength or insulating values are not of primary importance. Accordingly, expanded perlite of densities above 6 pounds per cubic foot and with broader limitations on particle size distribution will be suitable for the manufacture of such products. By this same token other heat resistant aggregates, such as expanded clay, cellular glass, cellular pumice, expanded vermiculite, and cellular diatomite, may also be used as a part or total replacement of the light or low density expanded perlite.

As for the clay-additive portion of the binder, it may be any of the well known types with the exception of those in the same classification as bentonite, namely, which expand upon mixture with water. Clays of the expanding type decrease the strength of the end product besides inducing cracking and other structural failure to a point where they are not useful in practicing the present invention. Clay minerals having ingredients which give rise to a substantial proportion of available alumina upon exposure to high heat include kaolinite, halloysite, illite, and attapulgite, and these may be preferred over other types which may be utilized where the refractory bonding in the final material will be of less importance than in some of the lowe temperature applications.

In the practice of this invention in its preferred form, we have alternatively used a kaolin or a ball clay in the amounts from about 4% to about 23% based on the dry solids weight of the product, through a useful product may include up to 35% of clay. Much less than 4% of clay makes the final product weak with reduced high temperature integrity, while more than 23% of clay unduly increases the density and thermal conductivity. Although a satisfactory product can be made within these limitations, we prefer a range from about 6% to about 18%.

It will of course be understood that for some insulation applications, materials other than clay may be utilized as a binder additive so long as the added material be inert to the other ingredients of the mixture.

In conjunction with the clay in the binder, we use an inorganic compound which may be either a potassium silicate, a sodium silicate or a combination of both. These two types of silicates, for all practical purposes, develop like properties in the finished product; however, the sodium silicate by virtue of its relatively low cost will be preferred.

Both of these silicates when properly cured become highly resistant to water and more so when admixed with clay. It is theorized that clays, specially of the kaolinite type, on heating, decompose into acid components that further enhance the insolubility of the silicate.

In the practice of this invention we have found that the more alkaline silicates have adverse effects on the properties of the insulating product, namely a tendency for rehydrating at low temperatures and excessive fluxing action at higher temperatures. Therefore, as pointed out hereinafter, safety limits are set forth for the amount of alkali to be tolerated.

We use soluble sodium and potassium silicates comprising alkali to silica ratios of from about 1:1.50 to about 1:3.75 and in amounts (as hereinafter shall be set forth on a dry weight basis) from about 4% to about 21% based on the dry weight solids of the product. While a satisfactory product may be made within these ranges, we prefer the following ranges: a ratio of alkali to silica from about 1:1.60 to about 1:3.75 and from about 5% to about 17% of dry silicate in the composition of the product.

If soluble silicates of an alkali-silica ratio higher than 1:1.60 are used, they will have a tendency to resorb moisture thereby adversely impairing the physical integrity of the insulation product at service temperatures below 800° F. In addition, if amounts less than 5% of dry silicates are used, the finished product will be weak, while more than 20% of dry silicate will induce excessive shrinkage of the insulating product as the temperature rises. This condition is prominent with the more alkaline silicates, due to their stronger fluxing power. Though for some applications the range of the soluble alkali metal silicate on a dry basis may be from about 4% to about 25%, the actual percentage selected for a given formulation will depend upon the ratio of the alkali to silica in the particular alkali metal silicate selected for use in accordance with the present invention. A review of the examples hereinafter set forth will reveal the fact that with the alkali silicates of lower ratio, the higher percentages thereof may be included without adversely affecting the resultant product. As that ratio of alkali to silica increases, the lower percentages will be preferred. As later pointed out, the present invention includes the concept of formulations in which the formation of glass at high temperature is indeed induced, but also limited in the extent to which glass may be formed to the amount needed for the bonding function without loss of strength in the end product. This comes about by reason of the fact that as glass is formed, it immediately combines with other materials of, or supplied by, the mixture to form materials stronger and more viscous than glass, and thus these materials of complex character maintain the strength of the product, even though the high operating temperatures would ordinarily appear to be excessively high for insulating materials. As we conceive it, the mineral components of the clay move into the glass producing a stiffening action and thus prevent sag and shrinkage and in general enhance the strength over and above that which has been attained with fiberglass and other similar high temperature insulating materials.

It will, of course, be recognized that the soluble silicates in the region of the ration of 1:1.60, alkali-silica, which have a tendency to resorb moisture can be satisfactorily made waterproof by treating them with waterproofing agents, such as silicones, or by the inclusion of finely divided calcium carbonate or zinc oxide.

In practicing the present invention, it has been found that the components of the binder when foamed and increased to approximately 50 to 100 times the original volume forms a lather that is ideally suited to the reception of a large quantity of the basic ingredient of the insulation product, such as expanded perlite, which can be mixed into the foam with a high degree of homogeneity. This foamed mixture is ideally suited as the feed material for a molding operation, whereby maximum advantage is taken from the batch components from the standpoint of large surface coverage with the minimum expenditure of binder and water. The foaming agents (or otherwise known as surfactants or surface active agents) utilized may be nonionic or anionic in character, or suitable combinations of any or all of these. Though the invention is not limited to foaming agents of any particular kind, examples of those found suitable include the following.

| Trade Name: | Formula and advertised function |
|---|---|
| Petro AD, Special | Alkyl naphthalene sodium sulfonate, detergent. |
| Petro AG | Alkyl naphthalene sodium sulfonate, wetting agent. |
| Naccosol A | Sodium alkyl naphthalene sulfonate, hydrotrope. |
| Texwet No. 1059 | Dodecylbenzene sulfonic acid. |
| Super-amide GR | Dimethanolamine condensate, foam stabilizer. |
| Tamol 731 | Sodium salt of carboxylated polyelectrolyte, dispersant. |
| Surfonic LF-6 | Alkyl phenol polyoxyalkylene ether, detergent. |
| Makon No. 10 | Alkyl phenoxy polyethylene ethanol, detergent. |
| Renex No. 30 | Polyoxyethylene ether alcohol, wetting agent. |
| Stepan 10-6-B | Coconut fatty acid alkanolamide, detergent. |

These have all been found compatible with the potassium or sodium silicates in that the ingredients of the surfactants do not at the temperature utilized in binder preparation chemically react therewith as by precipitation of one of the other ingredients of the mixture. For example, cationic surface active agents of the kind including Aliquat 26 (N-difatty dimethyl quaternary ammonium chloride) and Amine O (heterocyylic tertiary amine) are undesirable.

In general, we have found that cationic surfactants are unsatisfactory because of reaction with the alkali metal silicates.

The quantities of foaming agents necessary to produce a stable lather are relative and depend largely on the amounts and characteristics of the ingredients employed. In practice, we have found we can use from 0.5% to 3% of these surfactants by weight of the dry solids of the final product. Less than 0.5% of the foaming agent will not produce enough foam for the needed dispersion of the binder components throughout the aggregate, while for those cases where extra foaming power is required, amounts up to 3% of the surfactant will suffice. Inasmuch as the clay-silicate ratio of the binder is designed to provide a thermochemical bond with the aggregate at elevated temperatures, the absence of the foaming agent would require changing the clay-silicate ratio in order to avoid segregation of the binder in the insulating product. For example, we have found that the incorporation of higher amounts of binder than specified above results in increased density, reduced thermal insulating efficiency and loss of high temperature integrity. Similarly, the use of excessive amounts of water to achieve uniform dispersion of the binder results in inefficient drying accompanied by a high incidence of cracking.

The present invention further comprehends the addition of other materials inert to those above set forth and which for some applications may prove advantageous, for example, inorganic fibers such as fiberglass and asbestos can be added in minor proportions up to a maximum of 15% by weight of dry solids in the final product. More particularly, the expanded aggregate will, of course, include cellular perlite, cellular clay, cellular glass, and the following expanded materials: slag, vermiculite, cellular diatomite, and cellular pumice, it being understood that with each of these expanded and cellular materials, there may also be utilized the inorganic fibers noted above and, of course, any of the foregoing materials may be intermixed in any desired percentage within the preferred ratios noted above so that the total thereof will be from about 40% to about 90% on a dry weight basis. In this connection, all percentages set forth in the claims hereinafter are on a dry weight percentage basis.

In the following there will be presented typical examples of insulating material in respect to which we prefer to maintain the proportions of the batch components within the following ranges.

(a) For formulations using sodium silicate with an alkali to silica ratio of 1:3.75[1]:

| | Percent |
|---|---|
| Perlite | 61 to 87 |
| Clay | 4 to 21 |
| Sodium silicate (dry wt.) | 8 to 19 |
| Foaming agent | .4 to 3 |

(b) For formulations using sodium silicate with an alkali to silica ratio of 1:3.22[2]:

| | Percent |
|---|---|
| Perlite | 62 to 90 |
| Clay | 4 to 21 |
| Sodium silicate (dry wt.) | 5 to 17 |
| Foaming agent | .4 to 3 |

(c) For formulations using a potassium silicate with an alkali to silica ratio of 1:2.10[3]:

| | Percent |
|---|---|
| Perlite | 64 to 85 |
| Clay | 9 to 22 |
| Potassium silicate (dry wt.) | 5 to 14 |
| Foaming agent | .4 to 3 |

(d) For formulations using a sodium silicate with an alkali to silica ratio 1:1.60[4]:

| | Percent |
|---|---|
| Perlite | 67 to 82 |
| Clay | 13 to 23 |
| Sodium silicate (dry wt.) | 4 to 10 |
| Foaming agent | .4 to 3 |

[1] The "S-35" brand was utilized.
[2] The "N brand" was utilized.
[3] The "Kasil #6 brand" was utilized.
[4] The "BW brand" was utilized.

(The foregoing products are those of Philadelphia Quartz Co.)

The insulating compositions are prepared essentially as follows:

(A) BINDER PREPARATION

The binder components are first pre-stirred by the use of a high speed mixer, then subjected to a vigorous whipping action of a beater which readily introduces and entraps air into the binder solution. This sequestered air in the form of individual air bubbles is able to persist without coalescence with the other air bubbles for a certain period of time. The persistence of the air bubbles is determined by the nature of the surfactant used and also by the amount of water incorporated into the binder composition. In order to provide economical and manufacturing advantages, the water content is preferably maintained at a minimum level. In this respect we feel that a satisfactory product can be obtained with a total water content of from about 17% to about 70% of the dry weight of the product made from a given batch.

The consistency of the foam is very much like that of an aerosol shaving cream, and techniques for producing the latter are applicable to form the foam of the present invention.

In order to obtain a homogeneous mix of the binder components, the following mixing sequence is recommended:
(1) Mix the silicate with water.
(2) Add the clay and mix.
(3) Add the foamer and mix vigorously all the additives to obtain a stable foam.

(B) BATCH PREPARATION

As soon as the foam is ready, the aggregate is then incorporated, followed by further mixing until a grainy dry appearance of the batch is observed. It is important not to over-mix as this may fracture the cellular aggregate particles. The mixture may now be used for insulating purposes either directly or for molding into prefabricated shapes. In the latter form of the present invention, realization of the ultimate physical characteristics may be obtained if the molded piece is then dried or oven cured at a temperautre from about 300° F. to about 500° F. for a period long enough to insure that maximum water evaporation has taken place. The maximum water content of the dried block should not be over 4% to 5% by weight. It is also important that most of the water be driven off below the boiling point of the same (212° F.), otherwise a build-up of vapor pressure may rupture the molded product.

It is again emphasized that due to the refractory nature of all the major ingredients constituting the insulation product, plus the unique and effective way devised for dispersing the binder and other non-aggregate components throughout the aggregate, it is possible to obtain a finished molded piece of remarkable dimensional stability, strength and thermal insulation efficiency heretofore unobtainable in similar composites throughout a temperature range from about room temperature to 1700° F.

The mechanism of the continuous binder performance is based upon the development of ceramic bonds above about 1000° F. through a thermo-chemical reaction of the properly proportioned components. This is in sharp contrast with organic binders, employed in other similar products, which cannot offer this protection by the obvious reason that these are destroyed by heat several hundred degrees prior to the development of ceramic bonds. Therefore, a gap in the binder system prevails wherein such products containing organic binders are substantially weakened, particularly in the region of 600° F. to 1000° F. Thus, the binder composition of the present invention is unique by virtue of its inorganic, ceramic bond and uniform mode of distribution throughout the aggregate mass and by reason of the supply to the glass which is formed of the mineral components of the clay, which components have the stiffening and strengthening actions heretofore described.

The following are representative samples of compositions that we have found to have successful properties at all temperatures within the range from about room temperature to about 1700° F. and which offer substantial savings in raw material and manufacturing costs:

*Low density sample*

| | Percent |
|---|---|
| Expanded perlite [1] | 80.28 |
| Clay [2] | 3.52 |
| "N brand," sodium silicate (dry wt.) [3] | 14.71 |
| Petro A.D.S. (foaming agent) [4] | .36 |
| Texwet #1059 (foaming agent) [5] | 1.13 |
| Total | 100.00 |

Total water 45.6% based on the dry weight of the ingredients.

[1] This perlite had the following characteristics:
 (a) Loose bulk density 5.31#/feet³.
 (b) Screen analysis (cumulative).

| Percent retained by weight | On standard Tyler sieve No. |
|---|---|
| 6 | 40 |
| 33 | 60 |
| 51 | 80 |
| 57 | 100 |
| 91 | 200 |
| 9 | Pan |

[2] The clay used was a kaolin.
[3] This sodium silicate has an alkali-silica ratio of 1:3.23.
[4] An alkyl naphthalene sodium sulfonate.
[5] A dodecylbenzene sulfonic acid.

The characteristics of the product of the above formula were as follows:

Dry density _____ 13 #/cu. ft.
Transverse strength at 300° F. _____ 100 p.s.i.
Transverse strength at 1200° F. _____ 102. p.s.i.

Typical heat conductivity at a mean temperature of 500° F. was 0.70 B.t.u./hr./ft.²/° F./in. Linear shrinkage at 1200° F. was less than 1%; linear shrinkage at 170° F. was less than 2%.

*High density sample*

| | Percent |
|---|---|
| Expanded perlite | 74.87 |
| Clay | 5.94 |
| Sodium silicate (dry wt.) | 18.60 |
| Petro A.D.S. (foaming agent) | .59 |
| Total | 100.00 |

Total water 66.6 based on the dry weight of the ingredients.

The foregoing raw materials were the same as those used in the previous formula.

This product had the following characteristics:

Dry density _____ 17 #/ft.³
Transverse strength at 300° F. _____ 270 p.s.i.
Transverse strength at 1200° F. _____ 260 p.s.i.

Linear shrinkage at 1200° F. was less than 1%; linear shrinkage at 1700° F. was less than 2%.

*Example of a potassium silicate insulating block*

| | Percent |
|---|---|
| Perlite | 64.1 |
| Clay | 21.4 |
| Potassium silicate ("Kasil #6" brand, of an alkali-silica ratio 1:2.10) | 13.7 |
| Foaming agent ("Petro AG Special") | .8 |
| | 100.00 |

Density (#/ft.³) _____ 13
Transverse strength at 300° F. (p.s.i.) _____ 120
Percent linear shrinkage at 300° F. (p.s.i.) ___ 0
Transverse strength at 1200° F. (p.s.i.) _____ 110
Percent linear shrinkage at 1200° F. (p.s.i.) __ 0

*Example of a high alkali, sodium silicate, insulating block*

| | Percent |
|---|---|
| Perlite | 67.17 |
| Clay | 22.39 |
| Sodium silicate ("BW" brand, of an alkali to ratio 1:1.60) (dry basis) | 9.54 |
| Foaming Agent ("Petro AG Special") | .90 |
| | 100.00 |

Density (#/ft.³) _____ 13
Transverse strength at 300° F. (p.s.i.) _____ 140
Percent linear shrinkage 300° F. (p.s.i.) _____ 0
Transverse strength at 1200° F. (p.s.i.) _____ 110
Percent linear shrinkage at 1200° F. (p.s.i.) __ 0.20

It will be understood that in accordance with this invention, the ranges are relatively wide but so are the useful applications of thermal insulation material of widely differing character insofar as density and strength requirements may be concerned. In the examples, the manner in which these factors vary in accordance with the invention may be readily seen and in the appended claims there have been defined the formulations developed in accordance with this invention.

What is claimed is:

1. A thermal insulating material, having the property of forming ceramic bonds as its temperature is elevated from ambient temperature to about 1700° F., consisting essentially of
    from about 4% to about 35% of an aluminum silicate clay of the non-swelling type selected from the group consisting of kaolinite, halloysite, illite and attapulgite,
    from about 4% to about 25% on a dry weight basis of a water-soluble alkali metal silicate selected from the group consisting of potassium silicate and sodium silicate having a ratio of alkali to silicate from about 1 to 1.6 and to about 1 to 3.75,
    from about 0.3% to about 3% of a foaming agent inert to the alkali metal silicate, and
    from about 40% to about 90% of an expanded siliceous inorganic aggregate selected from the group consisting of expanded perlite, expanded clay, cellular glass, an expanded slag, expanded vermiculite, cellular diatomite and cellular pumice,
    said siliceous material each contributing to the formation of said ceramic bonds of glass-like type and the alumina content of said clay producing said ceramic bonds of increased strength at elevated temperatures.

2. The thermal insulating material of claim 1 in which said siliceous aggregate includes up to 15% of inorganic fibers.

3. A thermal insulating material, having the property of forming ceramic bonds as its temperature is elevated from ambient temperature to about 1700° F., consisting essentially of
    from about 9% to about 23% of an aluminum silicate clay of the non-swelling type selected from the group consisting of kaolinite, haloysite, illite and attapulgite,
    from about 5% to about 15% on a dry weight basis of a water-soluble alkali metal silicate selected from the group consisting of potassium silicate and sodium silicate having a ratio of alkali to silicate from about 1 to 1.6 to about 1 to 3.75,
    from about 0.3% to about 3% of a foaming agent inert to the alkali metal silicate, and
    from about 40% to about 90% of an expanded siliceous inorganic aggregate selected from the group consisting of expanded perlite, expanded clay, cellular glass, an expanded slag, expanded vermiculite, cellular diatomite and cellular pumice,
    said siliceous materials each contributing to the formation of said ceramic bonds of glass-like type and the alumina content of said clay producing said ceramic bonds of increased strength at elevated temperatures.

4. The terminal insulating material of claim 3 in which said siliceous aggregate includes up to 15% of inorganic fibers.

5. The method of producing moldable thermal insulating material which comprises mixing and beating together in parts by weight
    of from 9% to 23% of clay of the non-swelling type upon addition of water and including therein a high proportion of alumina and selected from the group consisting of kaolinite, halloysite, illite and attapulgite.
    on a dry basis of from 5% to 15% of a soluble alkali silicate in water solution selected from the group consisting of potassium silicate and sodium silicate having a ratio of alkali to silicate of from 1 to 1.6 to 1 to 3.75, and
    water and a foaming agent in quantities for production of a stable lather, said foaming agent being inert to the alkali metal silicate,
    adding into said stable lather in thorough mixture therewith from 40% to 90% of an expanded inorganic aggregate which may include from zero percent up to about 15% inorganic fiber selected from the group consisting of the following materials: expanded perlite, expanded clay, cellular glass, expanded slag, expanded vermiculite, cellular diatomite and cellular pumice, and applying heat to elevate the temperature of said mixture from about 300° F. to about 400° F. to set said silicate, the composition of said mixture having the property of forming ceramic bonds upon elevation of its temperature in normal use in the range above about 1000° F.

6. The method of producing moldable thermal insulating material which comprises mixing and beating together in parts by weight of from 4% to 35% of clay of the nonswelling type upon addition of water and including therein a high proportion of alumina and selected from the group consisting of kaolinite, halloysite, illite and attapulgite, on a dry basis of from 4% to 25% of a soluble alkali silicate in water solution selected from the group consisting of potassium silicate and sodium silicate having a ratio of alkali to silicate of from 1:1.6 to 1:3.75, and water and a foaming agent in quantities for production of a stable lather, said foaming agent being inert to the alkali metal silicate, adding into said stable lather in thorough mixture therewith from 40% to 90% of an expanded inorganic aggregate which may include from zero percent up to about 15% inorganic fiber selected from the group consisting of expanded perlite, expanded clay, cellular glass, an expanded slag, expanded vermiculite, cellular diatomite, and cellular pumice, and applying heat to evaluate the temperature of said mixture from about 300° F. to about 400° F. to set said silicate, the composition of said mixture having the property of forming ceramic bonds upon elevation of its temperature in normal use in the range above about 1000° F.

References Cited by the Examiner

UNITED STATES PATENTS

| 1,944,008 | 1/34 | Hobart | 106—75 |
| 2,425,151 | 8/47 | Greger | 106—67 |
| 2,921,862 | 1/60 | Sucetti | 106—88 |

TOBIAS E. LEVOW, *Primary Examiner.*

---

UNITED STATES PATENT OFFICE
CERTIFICATE OF CORRECTION

Patent No. 3,203,813          August 31, 1965

Vincent H. Gajardo et al.

It is hereby certified that error appears in the above numbered patent requiring correction and that the said Letters Patent should read as corrected below.

Column 2, lines 30 and 31, for "induicng" read -- inducing --; line 39, for "lowe" read -- low --; line 43, for "through" read -- though --; column 3, line 4, for "1:1.50" read -- 1:1.60 --; column 5, line 12, for "Pelite" read -- Perlite --; column 7, line 10, for "170° F." read -- 1700° F. --; lines 43, 45, 60 and 62, strike out "(p.s.i.)", each occurrence; same column 7, line 52, after "to" insert -- silica --.

Signed and sealed this 20th day of June 1967.

(SEAL)
Attest:

ERNEST W. SWIDER
Attesting Officer

EDWARD J. BRENNER
Commissioner of Patents